United States Patent
Heigl

(10) Patent No.: US 6,273,456 B1
(45) Date of Patent: Aug. 14, 2001

(54) GAS BAG

(75) Inventor: Jürgen Heigl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/378,423

(22) Filed: Aug. 20, 1999

(30) Foreign Application Priority Data

Aug. 20, 1998 (DE) .......................................... 298 14 990 U

(51) Int. Cl.⁷ .................................................. B60R 21/22
(52) U.S. Cl. .................................. 280/730.2; 280/728.1; 280/729; 280/742; 280/743.2
(58) Field of Search ................................ 280/728.1, 729, 280/730.1, 730.2, 742, 743.2

(56) References Cited

U.S. PATENT DOCUMENTS

| | | | |
|---|---|---|---|
| 3,614,127 | * | 10/1971 | Glance .................................. 280/729 |
| 3,630,472 | * | 12/1971 | Axenborg ................................ 244/32 |
| 4,262,931 | * | 4/1981 | Strasser et al. ....................... 280/729 |
| 5,458,366 | * | 10/1995 | Hock et al. ........................... 280/729 |
| 5,651,395 | * | 7/1997 | Graham et al. ....................... 139/390 |
| 5,823,568 | * | 10/1998 | Wittmann et al. ................. 280/743.1 |
| 5,909,895 | * | 6/1999 | Iino et al. ........................... 280/743.1 |
| 5,975,564 | * | 11/1999 | Smith et al. .......................... 280/729 |
| 5,997,037 | * | 12/1999 | Hill et al. .......................... 280/743.2 |
| 6,019,390 | * | 2/2000 | Keshavaraj ......................... 280/743.1 |
| 6,059,311 | * | 5/2000 | Wipasuramonton et al. ........ 280/729 |
| 6,059,312 | * | 5/2000 | Staub et al. .......................... 280/729 |
| 6,102,434 | * | 8/2000 | Ohlert et al. ....................... 280/728.2 |

* cited by examiner

*Primary Examiner*—Brian L. Johnson
*Assistant Examiner*—Deanna L. Draper
(74) *Attorney, Agent, or Firm*—Tarolli, Sundheim, Covell, Tummino & Szabo L.L.P.

(57) ABSTRACT

A gas bag has several walls of layers of fabric, which delimit the interior of said gas bag, adjacent walls being connected in one piece with each other by interweaving, and an outer periphery along which said walls are connected to each other by interweaving, and several chambers which are separated from each other by the provision of an elongated, interwoven region. The interwoven region provided for separating chambers has opposite ends and terminates at least at one of said ends at a distance from said interwoven outer periphery, in order to delimit at least one overflow channel in the region of said outer periphery of said gas bag. The interwoven region runs out in at least one of a rounding and a drop shape at the end terminating at a distance from the outer periphery.

12 Claims, 3 Drawing Sheets

GAS BAG

TECHNICAL FIELD

The invention relates to a gas bag for a vehicle occupant restraint system. More specifically the invention relates to a window bag covering the side windows of a front and a rear occupant.

BACKGROUND OF THE INVENTION

Such a gas bag is known from DE 297 09 389 in the form of a so-called side gas bag. A side gas bag extends similar to a curtain in the case of restraint between the occupant and the side windows of the vehicle and in particular reduces the risk of head injuries in the case of a side impact. Along the outer periphery of the gas bag the fabric layers are connected to each other by interweaving. The inner edge of the interwoven periphery is wave-shaped with successive concave shaped sections.

The walls of the gas bag are stressed most intensively during the inflation process in the region of the interwoven portions in the form of the peaks of adjacent concave shaped sections and at the end or ends of elongated interwoven regions separating adjacent chambers which stress can lead to the tearing of the fabric material.

BRIEF SUMMARY OF THE INVENTION

The invention provides a gas bag in which the stress on the warp and weft threads is reduced during inflation in fact at the end of the interwoven region. The gas bag according to the present invention has several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region. The interwoven region provided for separating chambers has opposite ends and terminates at least at one of said ends at a distance from said interwoven outer periphery, in order to delimit at least one overflow channel in the region of said outer periphery of said gas bag. The interwoven region, usually having the form of a line, runs out in at least one of a rounding (line defining a curve) and a drop shape at the end terminating at a distance from the outer periphery.

Through the measure according to the invention, the force peaks are reduced at the free end of the interwoven regions. The forces are introduced into the fabric so as to be distributed onto warp and weft threads over a larger area so that stress peaks are reduced.

The interwoven regions are preferably undulating lines which define the outer periphery of the gas bag and/or also define separations between gas bag chambers.

It is possible according to the invention that the entire line or else only the edge of the interwoven region adjoining the interior of the gas bag runs in an undulating shape which shape is defined by successive concave and convex portions of the edge.

The preferred embodiment of the gas bag makes provision that it is constructed as a side gas bag similar to a curtain. The interwoven region runs along the outer periphery. The interwoven regions separating adjoining chambers run obliquely to the warp and weft threads. For this, they can run in a straight line or else also in an undulating shape, as was already previously indicated.

DETAILED DESCRIPTION OF PREFERRED EMBODIMENTS

Figure 1:
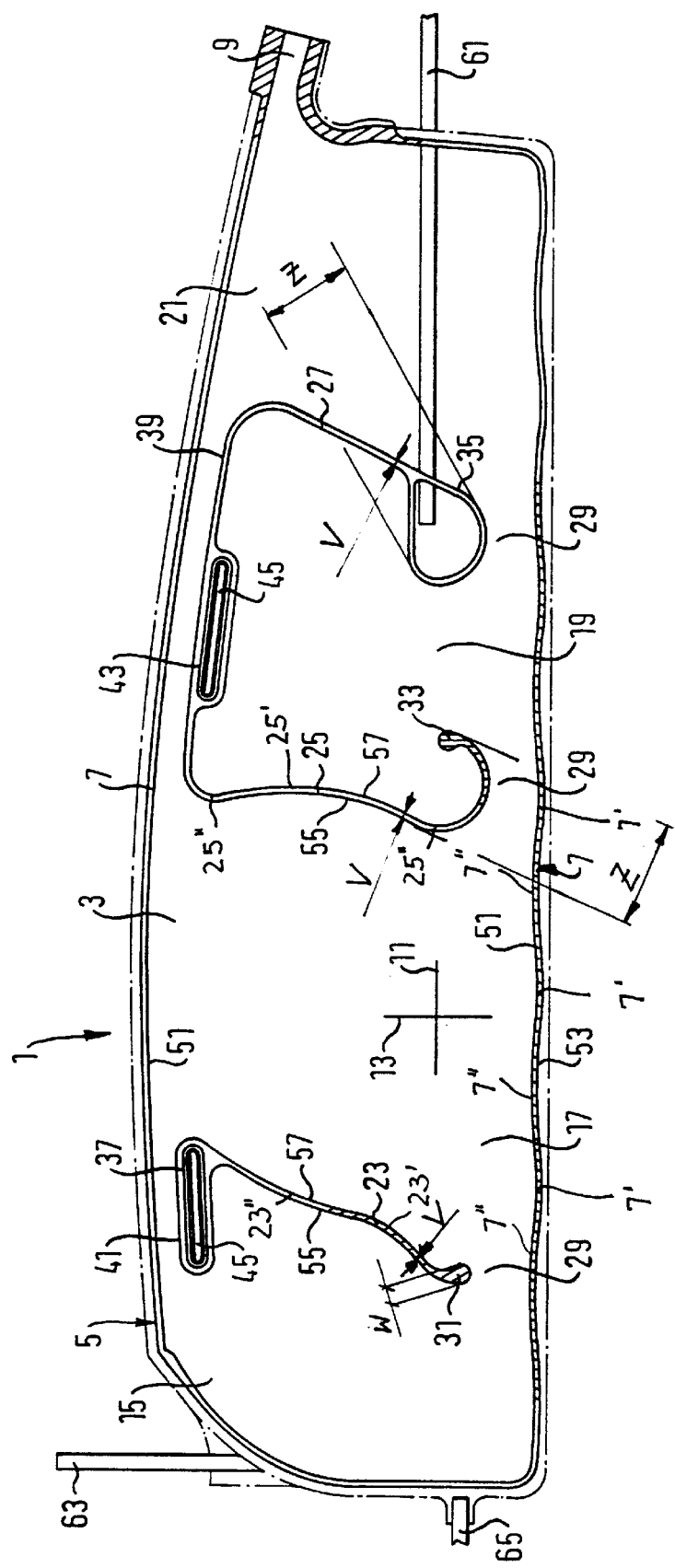
FIG. 1 shows a side view of a gas bag according to the invention in the fully inflated state, which, in the case of restraint, is arranged as a so-called ABC side gas bag laterally between the head of the front occupant and the head of the rear occupant and the side windows.

In FIG. 1 a gas bag is shown which consists of two opposite walls of one layer of fabric each, only one wall 3 of which is visible. The other wall, which lies behind the wall 3, is constructed in an identical manner. The gas bag 1 is adapted in the region of its upper outer periphery 5 to the shape of the roof frame of the vehicle, behind the paneling of which it is accommodated. In the region of the outer periphery, the two walls are connected in one piece with each other by interweaving. The interwoven region is designated by 7 and extends completely around the outer periphery of the gas bag up to an introduction opening 9 at the end of the gas bag on the rear side of the vehicle. The interwoven, linear region 7 is approximately 1 to 2 cm wide. The interwoven region 7 runs in an undulating form in the region of the lower outer periphery, the latter running approximately horizontally and being subjected to particularly high stresses owing to the dynamic inflation of the gas bag. With respect to the interior of the gas bag concave and convex portions 7 and 7, respectively, immediately adjoin each other in harmony without steps. Thereby, the warp and weft threads which are illustrated by way of example with the aid of one thread 11 and 13, respectively, are subjected to lower stresses than in a case in which the interwoven region were to run for example parallel to a warp thread 11. In the latter case, namely the warp thread 11 could not receive any tension and the entire tension would have to be received by the weft threads 13. Through the undulating interwoven region 7, in addition a high degree of gas-tightness results, because the warp and weft threads 11 and 13, respectively, can scarcely be displaced with respect to each other.

The side gas bag 1 which is shown has several chambers 15, 17, 19, 21, which however are all in flow connection with each other. The chambers are separated from each other by further interwoven, linear regions which are designated by the reference numbers 23 to 27. These interwoven regions run partially likewise in an undulating shape (see regions 23 and 25) with immediately adjoining concave and convex portions 23, 25, and 23, 25, respectively, or linearly and obliquely to the warp and the weft threads 11 and 13, respectively (cf. region 27). The interwoven regions 23 to 27 do not extend up to the lower outer periphery which is defined by the lower part of the interwoven region 7, but rather terminate at a distance therefrom, so that overflow channels 29 are produced.

The interwoven linear regions 23 to 27 each end in the form of a drop or a rounding, which are wider in their dimensions (maximum width W of a drop or maximum outer dimension Z of a rounding) than the linear regions 23 to 27

(having a width V immediately before the end of the regions 23 to 27), in order to avoid stress peaks in the region of the ends. Inside the drop-shaped end 31, 33 of the interwoven regions 23 and 25, the opposite walls are interwoven completely with each other, which means that the interwoven drop-shaped end is filled over the entire area. The lower end of the interwoven region 27, which terminates in a rounding, is not filled, however, but rather is only defined by a frame-shaped peripheral line 35.

The terminations of the interwoven regions 23, 25 and 27 extend in the region of the upper outer periphery, these regions 23, 25 and 27 continuing into each other, parallel to the outer periphery but at a distance therefrom. These parallel regions are designated by 37 and 39. Within the regions 37 and 39 there are interwoven regions 41 and 43 having a larger area, which each surround a slot 45 which extends through both walls and through which clamps for the fastening of a gas lance can be inserted in each case.

The distance between the upper outer periphery and the regions 37 and 39 running parallel to the outer periphery is adapted with respect to the outer periphery of the gas lance such that this does not have much play.

Previously, it was always stated that the interwoven regions as a whole run in an undulating shape. This can indeed be the case, as is also shown in FIG. 1. However, it is important for reducing the stress of the warp and weft threads 11, 13 that the edge of the interwoven region adjoining the interior of the gas bag runs in an undulating shape. This edge is designated by 51 with respect to the interwoven region 7. The outer edge 53 does not have to run in an undulating shape, because the interwoven region scarcely receives further forces along the outer edge, which is designated by 53.

The interwoven regions 23, 25 and 27 not only have an edge which adjoins the interior of the gas bag. Here, in fact, both opposed edges 55, 57 adjoin the interior of the gas bag, more precisely adjoin another chamber in each case. Accordingly, the edges 55 and 57 also do not have to run parallel to each other, as is illustrated in FIG. 1, in order to achieve the effect according to the invention.

In FIG. 1, tensioning straps 61, 63 and 65 are also shown. These tensioning straps are connected with the roof frame or with one of the columns of the vehicle. The gas bag is tensioned in the inflated state between the tensioning straps 61, 63 and 65. The tensioning strap 61 is connected with the walls 3 in the region of the rounding of the interwoven region 27, so as not to apply any additional stress onto the warp and weft threads in inflated sections.

Figure 2:
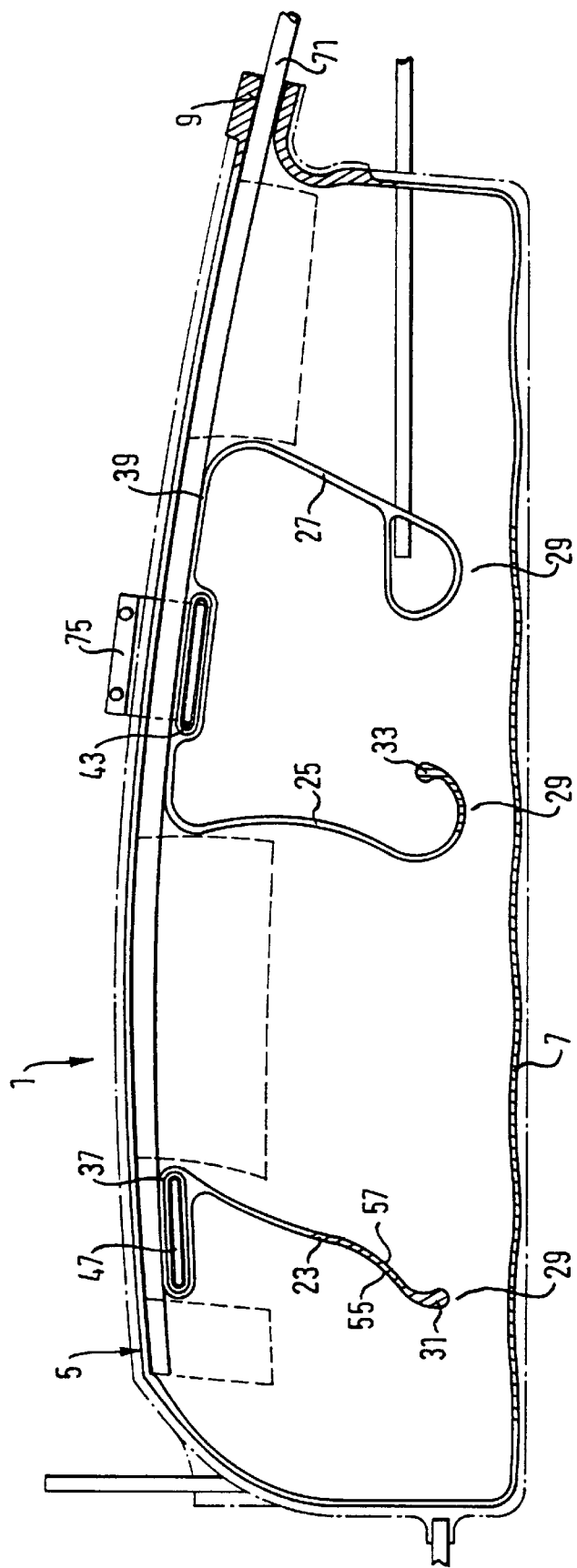
FIG. 2 shows a side view of the gas bag shown in FIG. 1 with the gas lance inserted, so that a gas bag restraint system according to the invention is produced, FIGS. 3, 4 and 5 each show cross-sectional views through the gas bag and the gas lance according to FIG. 2 in the region of the outer periphery, each figure illustrating a different embodiment with respect to a temperature protection.

FIG. 2 shows a gas bag restraint system with the gas bag according to the invention and also with a gas lance 71 introduced into it and running parallel to the roof frame, which gas lance is inserted via the introduction opening and is in flow connection with a gas generator which is not shown. The gas lance 71 has outflow openings on its lower edge in the region of the chambers 15, 17, 19 and 21. The gas lance is connected with the gas bag 1 by fastening clamps 73, 75. The fastening clamps 75 extend through slots 45 in the gas bag walls which, however, lie in interwoven regions 41, 43 and thus can not lead to a tearing of the gas bag, starting from the slots 45.

Figure 3:
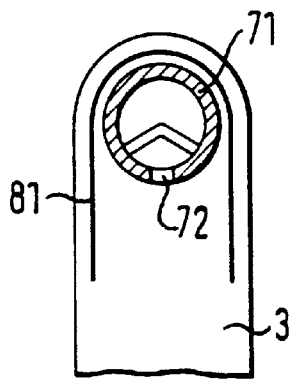
Figure 4:
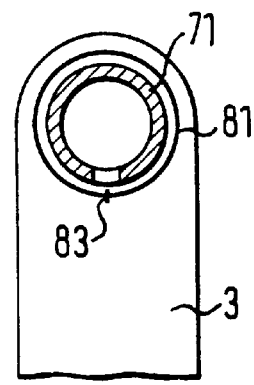
Figure 5:
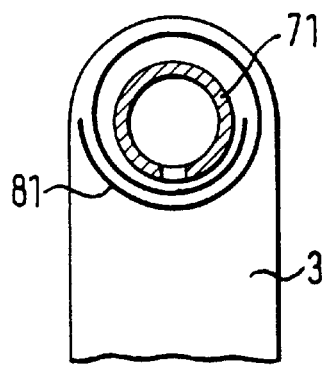
Figure 6:
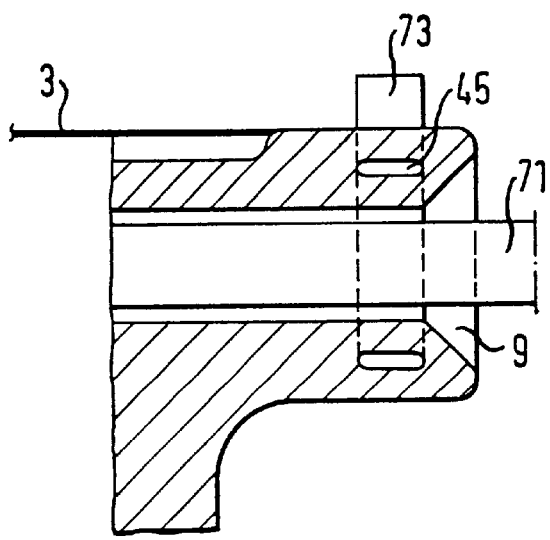
FIG. 6 shows an enlarged longitudinal sectional view of the restraint system according to FIG. 2 in the region of the introduction opening in the gas bag for the gas lance.

In order to avoid a thermal stressing of the fabric material in the region of the gas lance 71 at the start of the unfolding process, when the fabric material lies very close to the outflow openings, additional fabric layers are provided. These fabric layers are only provided in the regions of the outflow openings 72. The fabric layers can be fastened to the gas lance 71 or to the walls of the gas bag. FIGS. 3 to 5 show embodiments in which the fabric layer 81 is placed in a U-shape in cross-section around the gas lance 71 (FIG. 3), is slipped as a tubular band, closed circumferentially, onto the gas lance 71 and has a perforation line 84 on the underside (FIG. 4) or is wound around the gas lance 71 (FIG. 5). In each case, the fabric layer 81 permits an outflow of gas downwards into the gas bag.

In the case of restraint, gas is introduced into the gas bag 1 via the gas lance 71. The gas flows via the outflow opening into the chambers 15, 17, 19 and 21 and leads to a rapid unfolding of the gas bag downwards. Only when the gas bag is almost unfolded and offers its almost entire surface for protection, does a pressure equalization occur between the individual chambers via the overflow channels 29. The gas bag is tensioned between its tensioning straps 61, 63 and 65 and is positioned in a stable manner in the vehicle, laterally of the heads of the front and rear occupants and in front of the side windows. In the case of restraint, the head of the rear occupant can be protected approximately in the region of the chamber 21 from an impact onto the side window. In the case of a side impact, the head of the front occupant is protected from contact with the side window in the region of the chamber 17. With an impact from obliquely to the front, the chambers 15 and 19 can offer additional protection.

What is claimed is:

1. A gas bag for a vehicle occupant restraint system, with
several walls of layers of fabric, which delimit the interior of said gas bag,
adjacent walls being connected in one piece with each other by interweaving,
with an outer periphery along which said walls are connected to each other by interweaving, and
with several chambers which are separated from each other by the provision of an elongated, interwoven region, wherein said interwoven region provided for separating chambers having opposite ends and terminates at least at one of said ends at a distance from said interwoven outer periphery, in order to delimit at least one overflow channel in the region of said outer periphery of said gas bag, and
said interwoven region running out in at least one of a rounding and a drop shape at said end terminating at a distance from said outer periphery.

2. The gas bag according to claim 1, wherein said interwoven region for separating chambers terminates at a distance from an lower part of the outer periphery so that an overflow channel exists at the lower edge of said gas bag.

3. The gas bag according to claim 1, wherein said interwoven region separating said adjacent chambers runs obliquely to warp and weft threads of said fabric layers.

4. The gas bag according to claim 3, wherein said interwoven region provided for separating chambers runs in a linear shape.

5. A gas bag for a vehicle occupant restraint system, said gas bag comprising:
several walls of layers of fabric, which delimit the interior of said gas bag,
adjacent walls being connected in one piece with each other by interweaving,
an outer periphery along which said walls are connected to each other by interweaving, and
several chambers which are separated from each other by the provision of an elongated, interwoven region,
said interwoven region provided for separating chambers having opposite ends terminating at least at one of said ends at a distance from said interwoven outer periphery, in order to delimit at least one overflow channel in the region of said outer periphery of said gas bag, and said interwoven region running out in at least one of a rounding and a drop shape at said end terminating at a distance from said outer periphery, said elongated edge of the interwoven region adjoining the interior of adjacent chambers running at least in sections in an undulating shape which shape is defined by successive concave and convex portions of said edges.

6. The gas bag according to claim 5, wherein said gas bag is a side gas bag similar to a curtain, which moves in the case of restraint between an occupant and a side wall of a vehicle.

7. A gas bag for a vehicle occupant restraint system, said gas bag comprising:

several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region, said interwoven region provided for separating chambers having opposite ends terminating at least at one of said ends at a distance from said interwoven outer periphery, in order to delimit at least one overflow channel in the region of said outer periphery of said gas bag, said interwoven region running out in at least one of a rounding and a drop shape at said end terminating at a distance from said outer periphery, and at least in the region of a lower part of said outer periphery of said gas bag, the edge of said interwoven region running in an undulating shape.

8. A gas bag for a vehicle occupant restraint system, said gas bag comprising:

several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region, said interwoven region provided for separating chambers having opposite ends terminating at least at one of said ends at a distance from said interwoven outer periphery, in order to delimit at least one overflow channel in the region of said outer periphery of said gas bag, said interwoven region running out in at least one of a rounding and a drop shape at said end terminating at a distance from said outer periphery, said rounding being closed peripherally.

9. A gas bag for a vehicle occupant restraint system, said gas bag comprising:

several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region, said interwoven region provided for separating chambers having opposite ends terminating at least at one of said ends at a distance from said interwoven outer periphery, in order to delimit at least one overflow channel in the region of said outer periphery of said gas bag, said interwoven region running out in at least one of a rounding and a drop shape at said end terminating at a distance from said outer periphery, said walls being interwoven with each other over the entire surface inside said rounding or said drop shape.

10. A gas bag for a vehicle occupant restraint system, said gas bag comprising:

several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region, said interwoven region provided for separating chambers having opposite ends terminating at least at one of said ends at a distance from said interwoven outer periphery, in order to delimit at least one overflow channel in the region of said outer periphery of said gas bag, said interwoven region running out in at least one of a rounding and a drop shape at said end terminating at a distance from said outer periphery, said walls being not interwoven with each other over the entire surface inside said rounding or said drop shape, and said rounding or said drop shape being defined by a peripheral line formed by interweaving.

11. A gas bag for a vehicle occupant restraint system, said gas bag comprising:

several walls of layers of fabric, which delimit the interior of said gas bag, adjacent walls being connected in one piece with each other by interweaving, an outer periphery along which said walls are connected to each other by interweaving, and several chambers which are separated from each other by the provision of an elongated, interwoven region, said interwoven region provided for separating chambers having opposite ends terminating at least at one of said ends at a distance from said interwoven outer periphery, in order to delimit at least one overflow channel in the region of said outer periphery of said gas bag, and said interwoven region running out in at least one of a rounding and a drop shape at said end terminating at a distance from said outer periphery, said rounding or said drop being wider in dimension than the width of said interwoven region immediately before said end having said rounding and said drop, respectively.

12. A gas bag for a vehicle occupant restraint system, said gas bag comprising:

a plurality of fabric layers having an outer periphery, said fabric layers including adjacent layers interwoven in one piece along said outer periphery to form the interior of a gas bag, and a plurality of chambers formed in said interior of said gas bag by at least one elongated interwoven region of said fabric layers, said at least one interwoven region including opposite ends, at least one of said ends terminating at a distance from said interwoven outer periphery to form at least one overflow channel in the region of said outer periphery, said at least one interwoven region separating said chambers terminating in at least one of a rounding and a drop shape at said end terminating at a distance from said outer periphery.

\* \* \* \* \*